(12) United States Patent
Heath

(10) Patent No.: US 9,726,304 B2
(45) Date of Patent: Aug. 8, 2017

(54) DOUBLE OFFSET PIPE HANGER AND RESTRAINER

(75) Inventor: Richard W. Heath, Yorba Linda, CA (US)

(73) Assignee: Cooper B-Line, Inc., Houston, TX (US)

( * ) Notice: Subject to any disclaimer, the term of this patent is extended or adjusted under 35 U.S.C. 154(b) by 1017 days.

(21) Appl. No.: 11/944,348

(22) Filed: Nov. 21, 2007

(65) Prior Publication Data
US 2008/0129040 A1 Jun. 5, 2008

Related U.S. Application Data

(60) Provisional application No. 60/860,596, filed on Nov. 21, 2006.

(51) Int. Cl.
| | |
|---|---|
| *F16L 3/08* | (2006.01) |
| *F16L 3/12* | (2006.01) |
| *F16L 3/13* | (2006.01) |
| *F16L 3/127* | (2006.01) |

(52) U.S. Cl.
CPC .............. *F16L 3/13* (2013.01); *F16L 3/127* (2013.01)

(58) Field of Classification Search
USPC ....... 248/65, 73, 74.1, 214, 230.1, 201, 251, 248/254, 250, 322, 339, 340, 261, 262, 248/264, 266, 267, 268, 273, 300, 301; 211/105.1, 123, 87.01, 193, 70.4, 60.1, 211/90.01, 90.04
See application file for complete search history.

(56) References Cited

U.S. PATENT DOCUMENTS

| | | | | | |
|---|---|---|---|---|---|
| 93,517 | A | * | 8/1869 | Capen | 126/333 |
| 275,481 | A | * | 4/1883 | Gould | 248/265 |
| 848,195 | A | * | 3/1907 | Nelson | 248/254 |
| 852,684 | A | * | 5/1907 | Smith | 248/254 |
| 939,815 | A | * | 11/1909 | Dumond | 248/254 |
| 1,033,636 | A | * | 7/1912 | Sweezy | 248/254 |
| 1,037,186 | A | * | 8/1912 | Reed | 248/254 |
| 1,253,699 | A | * | 1/1918 | McCord | 248/254 |
| 1,286,376 | A | * | 12/1918 | Madsen | 248/223.31 |
| 1,304,705 | A | * | 5/1919 | Powell | 248/254 |
| 1,573,286 | A | * | 2/1926 | Whitney | 248/253 |
| 1,677,764 | A | * | 7/1928 | Gloekler | 193/38 |

(Continued)

FOREIGN PATENT DOCUMENTS

| | | |
|---|---|---|
| CA | 2637128 A1 | 5/2009 |
| GB | 2 040 679 A | 9/1980 |

OTHER PUBLICATIONS

AFCON Double Offset C.P.V.C. Hanger, Product No. 515, printed from the internet on Oct. 5, 2006, 6 pp.

*Primary Examiner* — Terrell McKinnon
*Assistant Examiner* — Michael McDuffie
(74) *Attorney, Agent, or Firm* — Senniger Powers LLP

(57) ABSTRACT

A double offset hanger and restrainer device for securely supporting a pipe or the like against undesirable sway and seismic disturbances is provided. The hanger and restrainer device includes a proximal portion mountable to a beam or the like and a specially contoured distal portion with an opening that can receive the pipe in a "snap-on" manner. The snap-on or press-fit feature also provides the advantage of retrofit installation, thereby permitting one or more of the devices to be added on without disassembly of an existing installation.

9 Claims, 17 Drawing Sheets

(56) References Cited

U.S. PATENT DOCUMENTS

| | | | |
|---|---|---|---|
| 2,374,787 A * | 5/1945 | Spiegel et al. | 211/105.1 |
| 2,484,615 A * | 10/1949 | Downs | 248/65 |
| 3,173,639 A * | 3/1965 | Dunn | 248/65 |
| 3,194,524 A | 7/1965 | Trumbull | |
| 3,317,167 A | 5/1967 | Becker et al. | |
| 3,661,272 A * | 5/1972 | Di Panni, Jr. | 211/105.1 |
| 3,664,511 A * | 5/1972 | Fenwick | 211/105.1 |
| 4,671,419 A | 6/1987 | Beverly | |
| 4,753,405 A * | 6/1988 | Camilleri | 248/235 |
| 4,991,801 A | 2/1991 | Trumbull | |
| 5,310,148 A * | 5/1994 | Dorr | 248/223.41 |
| 5,351,842 A * | 10/1994 | Remmers | 211/90.03 |
| 5,385,320 A | 1/1995 | Ismert et al. | |
| 5,518,127 A * | 5/1996 | Warmack et al. | 211/193 |
| 5,531,416 A * | 7/1996 | Remmers | 248/222.51 |
| D373,719 S * | 9/1996 | Lin | D8/373 |
| 5,669,589 A * | 9/1997 | Janssen et al. | 248/65 |
| 5,758,851 A * | 6/1998 | Remmers | 248/251 |
| 5,876,003 A * | 3/1999 | Waagenaar | 248/200 |
| 6,053,465 A * | 4/2000 | Kluge | 248/235 |
| 6,073,891 A * | 6/2000 | Humber | 248/74.5 |
| 6,213,437 B1 * | 4/2001 | Robbins | 248/261 |
| 6,554,237 B1 * | 4/2003 | Weber et al. | 248/261 |
| 6,568,645 B2 * | 5/2003 | Maddox | 248/231.81 |
| 6,702,236 B1 * | 3/2004 | Kirschner | 248/65 |
| 7,086,544 B1 * | 8/2006 | Doench | 211/105.1 |
| 7,331,549 B2 * | 2/2008 | Wirth et al. | 248/65 |
| 7,455,268 B2 * | 11/2008 | Heath | 248/74.1 |
| 7,900,783 B2 * | 3/2011 | Fernandez et al. | 211/90.02 |
| 8,500,078 B2 * | 8/2013 | Castellanos | 248/339 |
| 2005/0092870 A1 | 5/2005 | Maruyama | |
| 2005/0103961 A1 * | 5/2005 | Swanstrom et al. | 248/305 |
| 2006/0284026 A1 * | 12/2006 | Wirth | F16L 3/10 248/65 |

* cited by examiner

DOUBLE OFFSET PIPE HANGER AND RESTRAINER

CROSS-REFERENCE TO RELATED APPLICATION(S)

This application claims the benefit of U.S. Provisional Application Ser. No. 60/860,596, filed Nov. 21, 2006, entitled DOUBLE OFFSET PIPE HANGER AND RESTRAINER, the entirety of which is hereby incorporated by reference herein.

BACKGROUND OF THE INVENTION

Field of the Invention

The present invention relates generally to devices for supporting utility loads and the like, and in particular to a double offset hanger and restrainer for supporting and bracing a pipe.

Description of the Related Art

There are many products and assemblies thereof utilized by construction, building, plumbing and electrical contractors and workers for bracing and supporting pipes, ducts, sprinkler systems, fans, air-conditioners, electrical cables, communication lines and other loads from ceilings, beams and floors. These products include clamps, braces, cables, hooks, straps, hangers, plates, brackets, among other items.

In some instances, a utility pipe or duct is supported below a ceiling by mounting it to a beam that is also positioned below the ceiling. One disadvantage of conventional devices utilized for this purpose is that they lack versatility and flexibility in installation, thereby undesirably adding to the cost and time involved. Another disadvantage of some of these conventional devices is that they utilize designs that unnecessarily consume additional fabrication material in their construction. This additional material needlessly adds to the device weight without providing additional benefits in securely supporting the pipe, thereby again undesirably adding to the manufacturing cost and reducing the utility of the device.

In general, and disadvantageously, such pipe-supporting devices that are commonly used in the industry are difficult to install and expensive. Additionally, and undesirably, these devices may not be suited for reliably sustaining loads.

SUMMARY OF THE INVENTION

Some embodiments of the present invention provide a double offset hanger and restrainer device for securely supporting a pipe or the like against undesirable sway and seismic disturbances. The double offset desirably provides spatial clearance for the pipe relative to a support structure or beam to which the device is attached. The hanger and restrainer device includes a proximal portion mountable to a beam or the like and a specially contoured distal portion with an opening that can receive the pipe in a "snap-on" manner. Advantageously, the device is configured to provide support to the pipe in the directions that are exposed to load while maintaining structural integrity and substantially preventing or mitigating undesirable stress concentrations. The snap-on or press-fit feature also provides the advantage of retrofit installation, thereby permitting one or more of the devices to be added on without disassembly of an existing installation. The double offset device is easy to install and manufacture, and is well suited for reliably sustaining loads.

Some embodiments of the present invention provide a double offset device for supporting a pipe. The double offset device generally comprises a proximal portion, a distal portion spaced from the proximal portion, and an intermediate medial portion that connects the proximal portion and the distal portion. The proximal portion comprises a generally rectangular flat mounting flange that is attachable to a support structure. The distal portion comprises a generally curved flat plate and a slot for receiving the pipe therein. The slot comprises a closed end and an opposed open end for allowing passage of the pipe into the slot. The closed end comprises a predetermined degree of resilience for engaging the pipe in a snap-on manner. The closed end is generally semi-circular and includes a generally flat supporting portion proximate a junction of the closed end and the open end. The medial portion comprises a generally trapezoidal flat plate with a span that decreases in a direction extending from the proximal portion towards the distal portion. The generally trapezoidal flat plate offsets the slot of the distal portion in a first direction generally perpendicular to the mounting flange and in a second direction generally parallel to the mounting flange.

Some embodiments provide a double offset device for supporting a pipe. The double offset device generally comprises a proximal portion and a distal portion. The proximal portion is attachable to a support structure. The distal portion is substantially offset in two directions relative to the proximal portion and/or the support structure. The distal portion comprises an opening that is capable of resiliently receiving and snapping-on to the pipe such that a predetermined portion of the pipe outer contour abuts a closed end of the opening while a remaining peripherally aligned corresponding portion of the pipe outer contour is exposed.

Some embodiments provide a method of double offsettingly supporting a pipe relative to a beam to form an installation. The method comprises mounting a proximal portion of a double offset device to the beam such that a distal portion of the double offset device is offset in two directions relative to the proximal portion and/or the beam. The method further comprises connecting the pipe to the distal portion such that the pipe is resiliently received in a slot of the distal portion which forms a snap-on connection with the pipe and contacts a semi-circular surface of the pipe outer diameter while a remaining circumferentially aligned corresponding semi-circular surface of the pipe outer diameter is exposed.

For purposes of summarizing the invention, certain aspects, advantages and novel features of the invention have been described herein above. Of course, it is to be understood that not necessarily all such advantages may be achieved in accordance with any particular embodiment of the invention. Thus, the invention may be embodied or carried out in a manner that achieves or optimizes one advantage or group of advantages as taught or suggested herein without necessarily achieving other advantages as may be taught or suggested herein.

All of these embodiments are intended to be within the scope of the invention herein disclosed. These and other embodiments of the invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and some of its features and advantages, certain preferred embodiments and modifications thereof will become apparent to those skilled in the art from the detailed description herein having reference to the figures that follow, of which.

DETAILED DESCRIPTION OF THE PREFERRED EMBODIMENTS

The preferred embodiments of the invention described herein relate generally to devices for supporting utility loads and the like and, more particularly, to a double offset hanger and restrainer for supporting and bracing a pipe, suspended below a support surface or the like, against undesirable sway and seismic disturbances, and methods thereof While the description sets forth various embodiment specific details, it will be appreciated that the description is illustrative only and should not be construed in any way as limiting the invention. Furthermore, various applications of the invention, and modifications thereto, which may occur to those who are skilled in the art, are also encompassed by the general concepts described herein.

Figure 1:
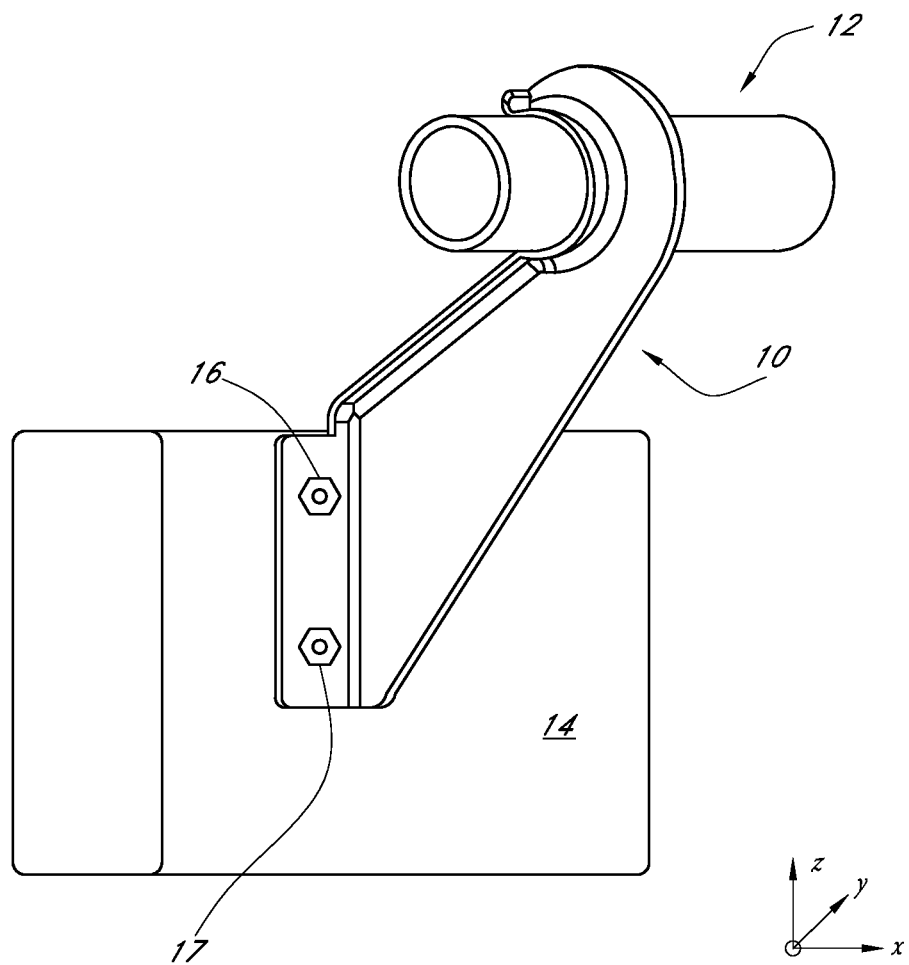
FIG. 1 is a simplified perspective view of a double offset hanger and restrainer mounted to a beam and supporting a pipe having features and advantageous in accordance with certain embodiments of the invention.
Figure 2:
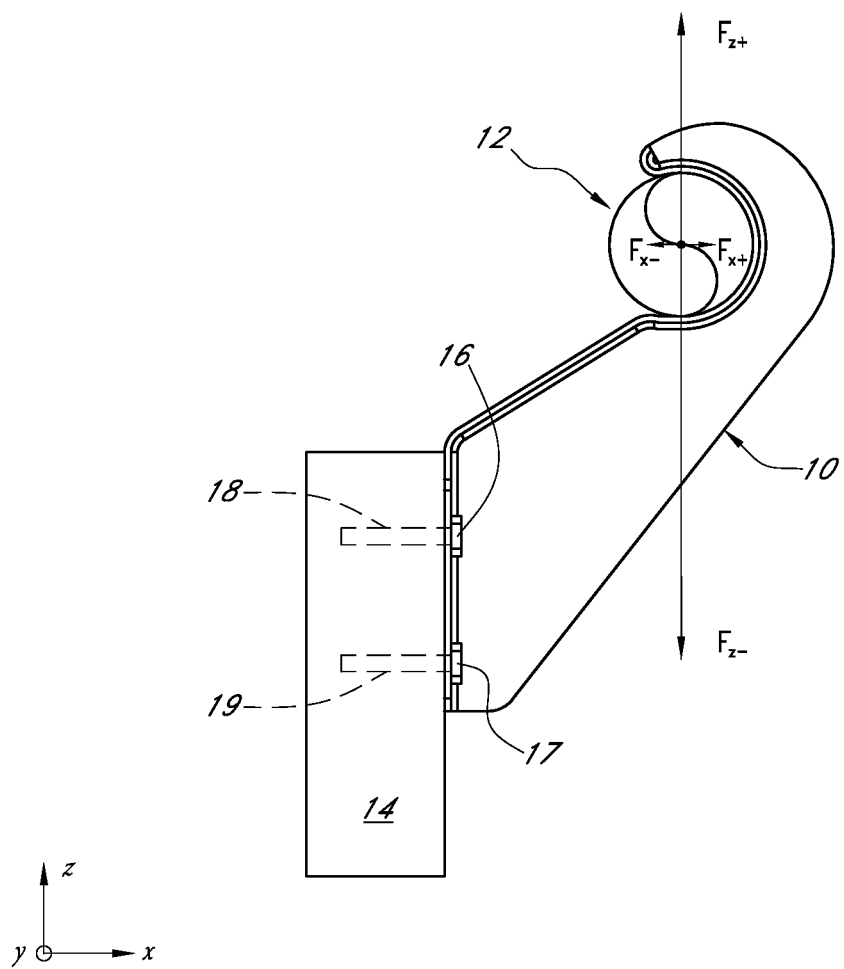
FIG. 2 is a simplified side view of FIG. 1 illustrating features and advantages in accordance with certain embodiments of the invention.
Figure 3:
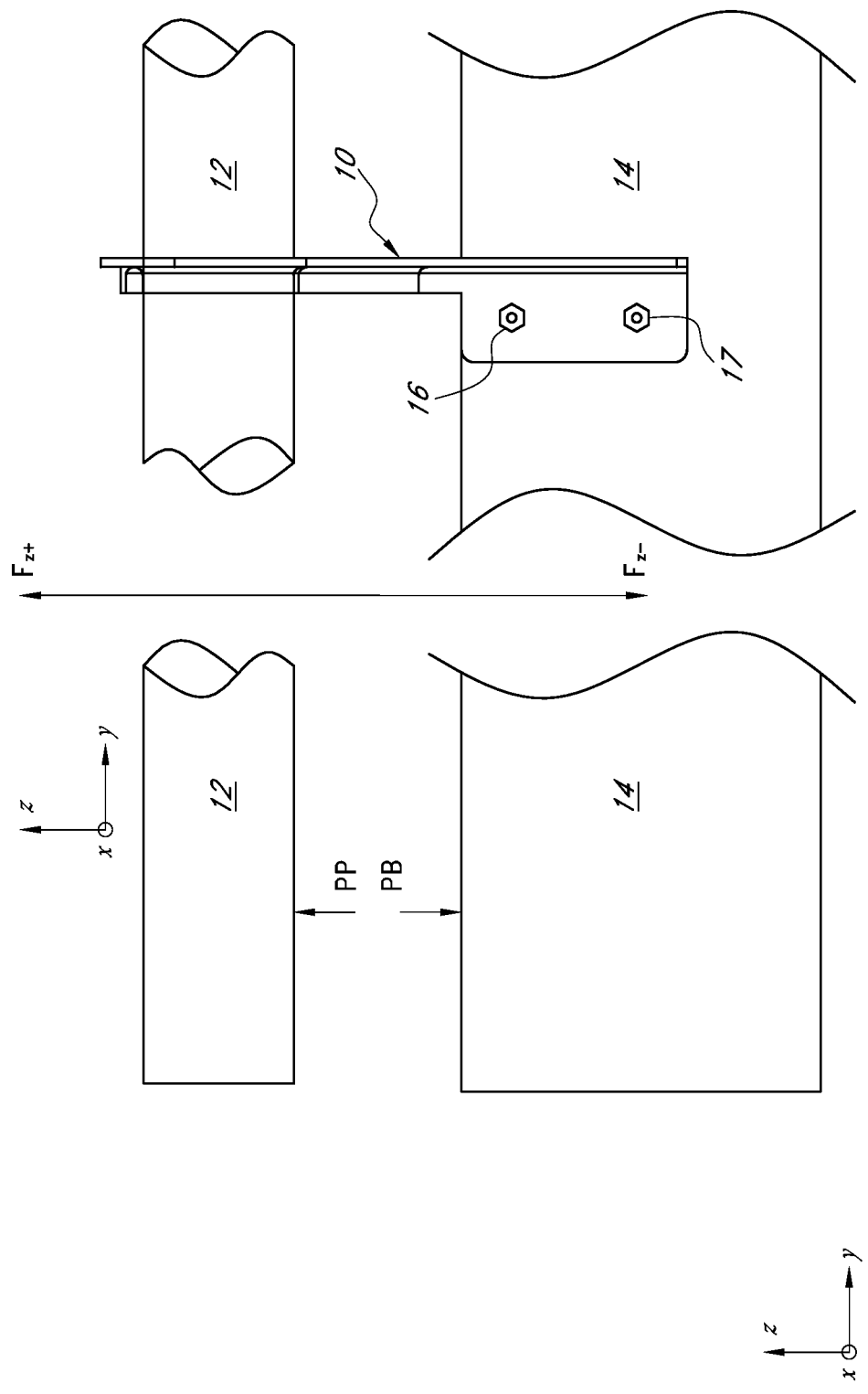
FIG. 3 is a simplified front view of FIG. 1 illustrating features and advantages in accordance with certain embodiments of the invention.
Figure 4:
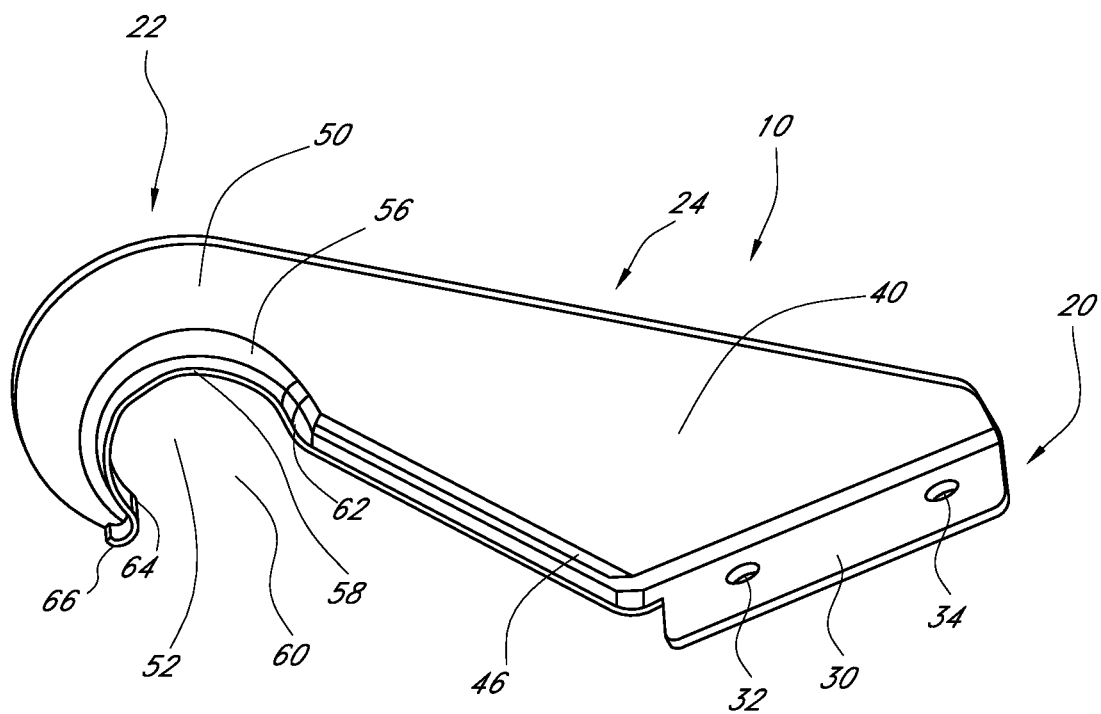
FIG. 4 is a simplified perspective of a double offset pipe hanger and restrainer having features and advantageous in accordance with certain embodiments of the invention.

FIGS. 1-3 show different views of a double offset hanger and restrainer or double offset attachment, fitting or mount) 10 supporting a pipe, conduit, channel or tube 12 and mounted, connected or attached to a beam, support structure or surface 14. The double offset device 10 is connected to the beam 14 by a pair of fasteners, screws, bolts or connector pins 16, 17 which are received in respective openings or cavities 18, 19 in the beam 14.

Typically, the beam 14 extends below a ceiling or upper support surface of a structure or building with the pipe 12 suspended therebelow and the double offset device 10 serves as a hanger and restrainer to support the pipe 12 against undesirable seismic and sway disturbances. Advantageously, the double offset device 10 is a versatile component that can be efficaciously utilized to hang pipes 12 and the like (for example, miscellaneous architectural, decorative and other mechanical devices) and restrain movement during seismic events.

The double offset or standoff device 10 generally extends in the x- and z-directions while the surface of the beam to which the device is mounted extends in the z- and y-directions as defined by a right-handed three dimensional Cartesian coordinate system. It should be understood that this coordinate system is for reference only and not limiting, and other coordinate systems may be efficaciously used to depict orientation, as needed or desired.

As discussed further below, the double offset device 10 desirably provides a snap-on feature to receive the pipe 12 within a generally semi-circular opening, slot or cavity at a distal portion of the double offset device 10. Also as discussed further below, in some embodiments, a generally flat portion of the pipe-receiving opening provides the desired support and restraining capability in the z-direction.

The generally semi-circular opening, slot or cavity of the double offset device 10 provides several advantages compared to a hole or cylinder which surrounds the entire outer diameter or perimeter of the pipe 12 since the forces applied to the pipe 12 are substantially in the z-direction (as generally depicted by arrows $F_{z+}$ and $F_{z-}$) while the forces exerted in the x-direction are negligible or substantially zero (as generally depicted by arrows $F_{x+}$ and $F_{x-}$). Stated different, the double offset device 10 of embodiments of the invention eliminates redundancy and undesirable wastage of material since the relevant forces applied to the pipe 12 are substantially in a vertical plane (as generally depicted by arrows $F_{z+}$ and $F_{z-}$) and negligible in a horizontal plane (as generally depicted by arrows $F_{x+}$ and $F_{x-}$).

Embodiments of the double offset device 10 are desirably configured to prevent or mitigate undesirable stress concentration(s) which could lead to fracture or breakage location(s) or points, thereby advantageously preventing device failure or fracture. Advantageously, this is accomplished by not incorporating any strength compromising bends or cutouts while maintaining suitable or optimal structural strength.

Another advantage of embodiments of the double offset device 10 is that the spacing between the positions of the fasteners, screws, bolts or connector pins 16, 17 is optimized. This desirably allows for the use of smaller size fasteners 16, 17, for example, screws of smaller diameter and length. This desirably saves on the installation cost.

Still another advantage of embodiments of the double offset device 10 is that its versatility and utility permits retrofit installation and maintenance, since typically multiple spaced devices 10 are used to support the pipe 12 over its length. For example, FIG. 3 shows another location where the device can be attached to the pipe 12 (denoted by arrow PP) and the support beam 14 (denoted by arrow PB). Embodiments of the double offset device 10 desirably comprise an opening, slot or cavity that provides a snap-on mating or connection with the outer diameter or perimeter of the pipe 12.

Thus, desirably additional double offset devices 10 can be conveniently installed to provide greater support (and/or to replace any worn out devices) without disassembly of the system installation. This significant advantage saves on cost and time and cannot be achieved by a device that has a hole that circumscribes the entire outer diameter or perimeter of the pipe 12, wherein major time and cost has to be expended to disassemble and reassemble the entire installation.

The pipe 12, in some embodiments, comprises a thermoplastic CPVC (chlorinated poly vinyl chloride) pipe and associated fitting material. In some embodiments, the pipe 12 can be used for carrying or transporting fluid (liquid and/or gas) for fire suppression or sprinkler systems and other plumbing applications. The pipe 12 can also be used for potable water distribution, corrosive fluid handling in industry, gas (e.g. natural gas) distribution, among others, with efficacy, as needed or desired. Though typically the inner cross-section of the pipe 12 is generally circular, in modified embodiments, the pipe 12 can efficaciously comprise an ellipsoid, oval or polygonal cross-section, as needed or desired.

The pipe 12, in some embodiments, is manufactured by extrusion in sizes in the range from about ¼ inch to about 12 inch nominal inner diameter, including all values and sub-ranges therebetween. For many plumbing systems, the pipe 12 is manufactured by extrusion in sizes in the range from about ¼ inch to about 2 inches nominal inner diameter, including all values and sub-ranges therebetween.

In some embodiments, the pipe 12 can serve as a conduit, passageway or protective cover for one or more transmission lines. These can include, without limitation, fluid carrying lines or pipes, electrical lines such as cables and the like, and combinations thereof, as needed or desired.

The beam 14, in some embodiments, comprises wood or a wooden material. In this case, the fasteners or screws 16, 17 can be used to create respective openings 18, 19 without the need for pre-drilling to connect or mount the double offset device 10 to the beam 14.

The beam 14, in some embodiments, comprises a metal or alloy such as steel or the like. In this case, the openings 18, 19 can be pre-drilled in the beam 14 to receive respective fasteners or screws 16, 17 to connect or mount the double offset device 10 to the beam 14.

The beam 14 typically comprises a general rectangular cross-section and spans lengthwise generally horizontally below a ceiling or the like. In modified embodiments, the double offset device 10 can be efficaciously connected or mounted to other support structures or surfaces, including but not limited to, side walls or beams which may be generally vertically or angularly oriented, as needed or desired.

In modified embodiments, the pipe 12 and/or the beam 14 can be fabricated by various other techniques, mounted in other orientations, configured in other dimensional and geometrical manners, and can comprise various other materials. For example, the pipe 12 and/or the beam 14 can efficaciously comprise other suitable metals, alloys, ceramics, plastics, thermoplastics, organic materials and the like, and combination thereof, as needed or desired.

Any of the embodiments of the double offset pipe hanger and restrainer (such as the double offset device, attachment, fitting or mount 10) disclosed, taught or suggested herein desirably comprise a suitably strong material. In some embodiments, the double offset device 10 (including its modified embodiments) comprises an alloy such as steel, for example, 16 gauge pre-galvanized carbon steel.

In other embodiments, the double offset device 10 (including its modified embodiments) can efficaciously comprise other suitable alloys, metals, ceramics, plastics, thermoplastics, organic materials and the like, and any combinations thereof, as needed or desired.

Any of the embodiments of the double offset pipe hanger and restrainer (such as the double offset device, attachment, fitting or mount 10) disclosed, taught or suggested herein can be fabricated or manufactured by utilizing a wide variety of techniques or methods. In some embodiments, the double offset device 10 (including its modified embodiments) is fabricated by stamping, bending and/or punching operations a generally flat sheet of material and, in some embodiments, comprises an integral unit and/or is integrally formed.

Advantageously, such a manufacturing process is especially suited for automated assembly lines, wherein stamping, punching and bending operations can be performed at high speeds and pick-and-place robotic arms or systems can efficiently manipulate the component(s) and control the manufacturing process. Moreover, the simplicity and speed of this manufacturing method results in an end product that is economical to manufacture, and thus is desirably inexpensive.

In other embodiments, the double offset device 10 (including its modified embodiments) can efficaciously be fabricated by casting, forging, molding, machining, lasing, laser processing, welding, gluing, adhesively fixing, and any combinations thereof including stamping, bending and/or punching operations, among others, as required or desired. The double offset device 10 (including its modified embodiments) can efficaciously be manufactured by fabricating separate portions and then joining these together to form the device. Preferably, however, the device is integrally formed of a single piece of material.

Some Double Offset Pipe Support Embodiments

FIGS. 4-7 show different views of some embodiments of a double offset or standoff pipe hanger and restrainer, or double offset support device 10. The double offset support device 10 generally comprises a proximal mounting portion, section or flange 20, a distal connection or attachment portion or section 22, and an intermediate medial main body portion or section 24.

The proximal mounting portion 20 is attachable to the beam 14 or other support structure and, in some embodiments, comprises a generally rectangular flat plate or flange 30 with a pair of optimally spaced holes, opening or cavities 32, 34. The holes 32, 34 are configured and/or adapted to receive respective fasteners, screws, bolts or connector pins 16, 17 that extend into respective beam holes or openings 18, 19.

The holes 32, 34, in some embodiments, are desirably spaced such that the positions of the fasteners, screws, bolts or connector pins 16, 17 are optimized. This advantageously allows for the use of smaller size fasteners 16, 17, for example, screws of smaller diameter and length, which in turn can save on the installation cost.

In some embodiments, the proximal mounting portion 20 and/or its generally flat plate or flange 30 is oriented or angled generally perpendicular to the medial main body portion or section 24 and/or the distal connection or attachment portion or section 22. In modified embodiments, the proximal mounting portion 20 and/or its generally flat plate or flange 30 can efficaciously be oriented or angled in other manners relative to the medial main body portion or section 24 and/or the distal connection or attachment portion or section 22, as needed or desired.

The intermediate medial main body portion or section 24, in some embodiments, generally comprises a generally flat trapezoidal plate 40. Advantageously, the medial plate 40 does not have any undesirable holes, cut-outs or bends that can cause adverse stress concentration locations or points, thereby providing optimized device structural integrity and strength.

In some embodiments, the length or span of the generally flat trapezoidal plate 40 is flared, tapered or reduced in the direction extending between the proximal portion 20 and the distal portion 22, to desirably reduce the amount of material used to fabricate the device without comprising on device structural strength and integrity. In modified embodiments, the medial flat plate 40 may be efficaciously comprise a generally fixed length or span, or may comprise other suitable configurations, as needed or desired.

The intermediate medial main body portion or section 24 and/or the generally flat trapezoidal plate 40, in some embodiments, transitions or connects with the proximal mounting portion 20 and/or its generally flat plate or flange 30 by a generally curved portion 42. In modified embodiments, the intermediate medial main body portion or section 24 and/or the generally flat trapezoidal plate 40 can efficaciously connect or transition with the proximal mounting portion 20 and/or its generally flat plate or flange 30 in other suitable manners, for example, but not limited to, a generally sharp-cornered perpendicular or angular connection, as needed or desired.

In some embodiments, the intermediate medial main body portion or section 24 comprises a generally curved portion 44 that connects or transitions the medial plate 40 to an inner generally straight supporting rib, rim, ridge or protrusion 46 of the medial portion 24. The supporting rib, rim, ridge or protrusion 46 advantageously optimizes or enhances the device structural integrity and/or strength. In modified embodiments, the intermediate medial plate 40 can efficaciously connect or transition with the supporting rib 46 in other suitable manners, for example, but not limited to, a generally sharp-cornered perpendicular or angular connection, as needed or desired.

The supporting rib, rim, ridge or protrusion 46, in some embodiments, extends generally perpendicular to the generally flat trapezoidal medial plate 40, and extends on only one side of the generally flat trapezoidal medial plate 40. In modified embodiments, a complementary and/or opposing supporting rib, rim, ridge or protrusion similar to the rib 46 can be provided on the other side of the generally flat trapezoidal medial plate 40 with efficacy, as needed or desired.

The distal connection or attachment portion or section 22, in some embodiments, generally comprises a generally flat curved plate 50 and a specially designed generally curved or semi-circular opening, slot or cavity 52 that receives the pipe 12. In modified embodiments, the distal plate 50 can efficaciously comprise other suitable shapes, for example, polygonal or the like and combinations thereof, as needed or desired.

Advantageously, the distal connection or attachment portion or section 22 and/or the opening, slot or cavity 52 receives that pipe 12 in a snap-on (or press-fit) fashion and provides the desired support against undesirable sway and seismic disturbances by taking into consideration that almost all forces of interest acting on the pipe 12 will be in a generally vertical or z-direction. Thus, wastage of precious material is mitigated and the device design also allows for retrofit connection, as discussed in more detail below.

The distal connection or attachment portion or section 22 of embodiments of the invention advantageously provides a double offset or standoff for the pipe 12 which is received in the double offset opening, slot or cavity 52 relative to the beam 14. The double offset desirably provides clearance space for the pipe 12 relative to the beam 14.

The double offset, in some embodiments, is provided in the x- and z-directions relative to the beam 14. Stated differently, the double offset is provided in two directions which are respectively generally perpendicular and parallel to the beam 14 (and or its mounting surface). In other words, in some embodiments, the double offset is provided in two directions which are respectively generally perpendicular and parallel to the device distal portion 20 (and/or its generally flat mounting flange 30).

In some embodiments, the distal connection or attachment portion or section 22 comprises a generally curved portion 54 that connects or transitions the distal plate 50 to an inner generally curved or semi-circular supporting rib, rim, ridge or protrusion 56 of the distal portion 22. The supporting rib, rim, ridge or protrusion 56 advantageously provides pipe support and optimizes or enhances the device structural integrity and/or strength. In modified embodiments, the distal plate 50 can efficaciously connect or transition with the supporting rib 56 in other suitable manners, for example, but not limited to, a generally sharp-cornered perpendicular or angular connection, as needed or desired.

The supporting rib, rim, ridge or protrusion 56, in some embodiments, extends generally perpendicular to the generally flat curved distal plate 50, and extends on only one side of the generally flat curved distal plate 50. In modified embodiments, a complementary and/or opposing supporting rib, rim, ridge or protrusion similar to the rib 56 can be provided on the other side of the generally flat curved distal plate 50 with efficacy, as needed or desired.

The generally curved or semi-circular pipe-receiving opening, slot or cavity 52 is generally defined by a closed portion, end or surface 58 and an open portion, end or surface 60. The closed portion, end or surface 58, in some embodiments, is generally curved or semicircular in shape to generally conform to the outer contour or perimeter of the pipe 12 which mechanically contacts or abuts against the closed portion, end or surface 58 when it is received in the opening or slot 52. Of course, in modified embodiments, the shape of the closed portion, end or surface 58 may be modified depending on the outer contour of the pipe, conduit or tube to be supported by the double offset device.

The closed portion, end or surface 58, in some embodiments, is generally defined by the inner surface of the generally curved or semi-circular supporting rib, rim, ridge or protrusion 56 (or the rib 56 itself) and the adjacent generally curved or semi-circular inner surface of the distal plate 50 (or the adjacent generally curved or semi-circular inner surface of the distal plate 50 itself). In modified embodiments, and as indicated above, the inner surface of a complementary and/or opposing supporting rib, rim, ridge or protrusion similar to the rib 56 can be provided on the other side of the generally flat curved distal plate 50 with efficacy, as needed or desired, and this rib surface (or the rib itself) can also form part of the closed portion, end or surface 58.

In some embodiments, the medial portion rib 46 and the distal portion rib 56 are coextensive and their transition point or location generally defines a flat surface or portion 62 of the slot closed end 58. The flat surface or portion 62 is adjacent or proximate the slot open end 60.

The flat surface or portion 62, in some embodiments, is generally defined by an inner generally flat surface of the otherwise generally curved or semi-circular supporting rib, rim, ridge or protrusion 56 and the adjacent inner generally flat surface of the distal plate 50. In modified embodiments, and as indicated above, the inner surface of a complementary and/or opposing supporting rib, rim, ridge or protrusion similar to the rib 56 can be provided on the other side of the distal plate 50 with efficacy, as needed or desired, and can also form part of the flat surface or portion 62.

One advantage of embodiments of the flat surface or portion 62 is that it improved provides pipe support in the generally vertical direction. Another advantage of embodiments of the flat surface or portion 62 is that it facilitates entry of the pipe 12 into the opening or slot 52.

In some embodiments, a generally distal-most portion of the slot closed end 58 is defined by a generally curved surface or portion 64 which is also proximate a junction of the slot closed and open ends 58, 60. The generally curved surface or portion 64 is substantially opposed to the flat surface or portion 62 and, in some embodiments, facilitates in providing a snap-on type connection, fit or attachment to the pipe 12.

This desirable snap-on type connection, fit or attachment between the pipe 12 and the double offset device 10 of embodiments of the invention is achieved by providing a controlled and/or predetermined degree of device resilience, flexibility, springiness, elasticity or pliability while maintaining adequate device structural strength and integrity. Thus, during the process of securing the pipe 12 to the device distal portion 22, the distal portion 22, and/or the distal plate 50, and/or the distal opening, cavity or slot 52, and/or the distal rib 56, and/or the distal closed surface 58, and/or the curved end portion 64 can undergo temporary deformation, for example, plastic deformation, to resiliently receive and snap-on to the pipe 12.

In some embodiments, a generally distal-most portion of the rib 56 comprises a hook-like or curved portion, section or surface 66, adjacent the curved end portion 64, which is bent in a generally opposed direction relative to most of the remainder part of the rib 56 (and/or the curved end portion 64). This hook-like or curved portion, section or surface 66, in some embodiments, is a feature that can be a consequence of manufacturing the double offset device 10 from a generally flat strip of material and then subjecting the strip to bending operations (in conjunction with stamping and/or punching operations), or he like.

In some embodiments, the double offset pipe hanger and restrainer 10 is specially configured and dimensioned to support an industry standard 1" CPVC pipe (nominal inner diameter of about 1 inch). As the skilled artisan will appreciate the double offset device of embodiments of the invention can be efficaciously utilized to support other loads, as needed or desired. The following dimensions are exemplary of a double offset device 10 particularly suited for supporting an industry standard 1" CPVC pipe. As the skilled artisan will also appreciate, the offset or standoff provided by the following exemplary dimensions can be varied with efficacy, as needed or desired.

Figure 5:
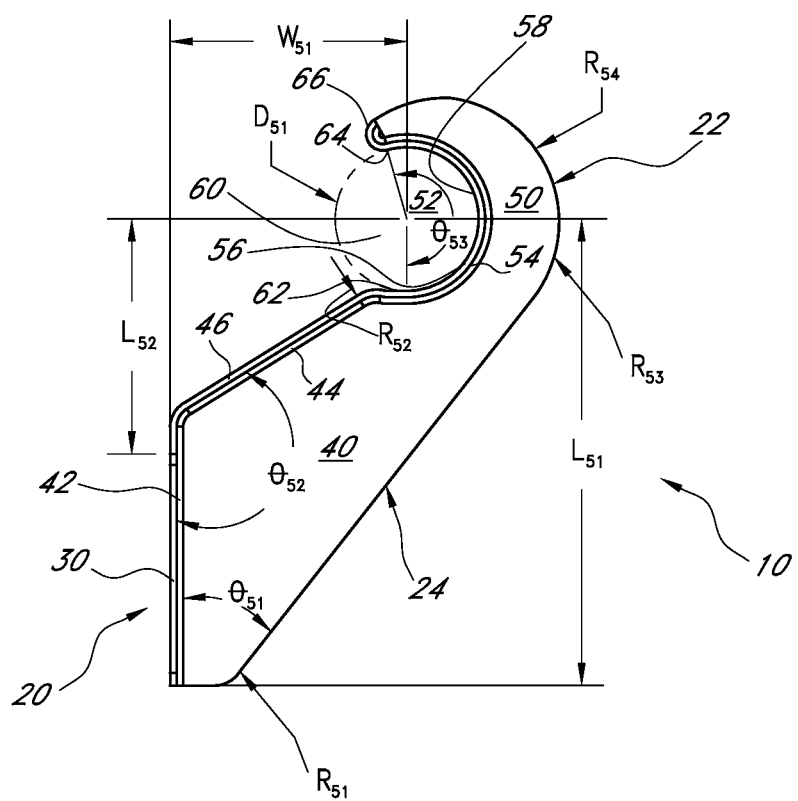
FIG. 5 is a simplified side view of the double offset pipe hanger and restrainer FIG. 4 illustrating features and advantages in accordance with certain embodiments of the invention.

Referring in particular to FIG. 5, in some embodiments, the distance or length $L_{51}$ is about 10.9 cm (4.283 inches), the distance or length $L_{52}$ is about 5.5 cm (2.158 inches), the distance or width $W_{51}$ is about 5.5 cm (2.158 inches), the diameter $D_{51}$ is about 3.3 cm (1.315 inches), the angle $\theta_{51}$ is about 38.18°, the angle $\theta_{52}$ is about 121.94°, the angle $\theta_{53}$ is about 202.00°, the radius of curvature $R_{51}$ is about 6.4 mm (0.250 inch(es)), the radius of curvature $R_{52}$ is about 7.9 mm (0.312 inch(es)), the radius of curvature $R_{53}$ is about 3.4 cm (1.345 inches), and the radius of curvature $R_{54}$ is about 2.6 cm (1.022 inches). In modified embodiments, the double offset pipe hanger and restrainer 10 can be dimensioned in other manners with efficacy, as needed or desired.

Figure 6:
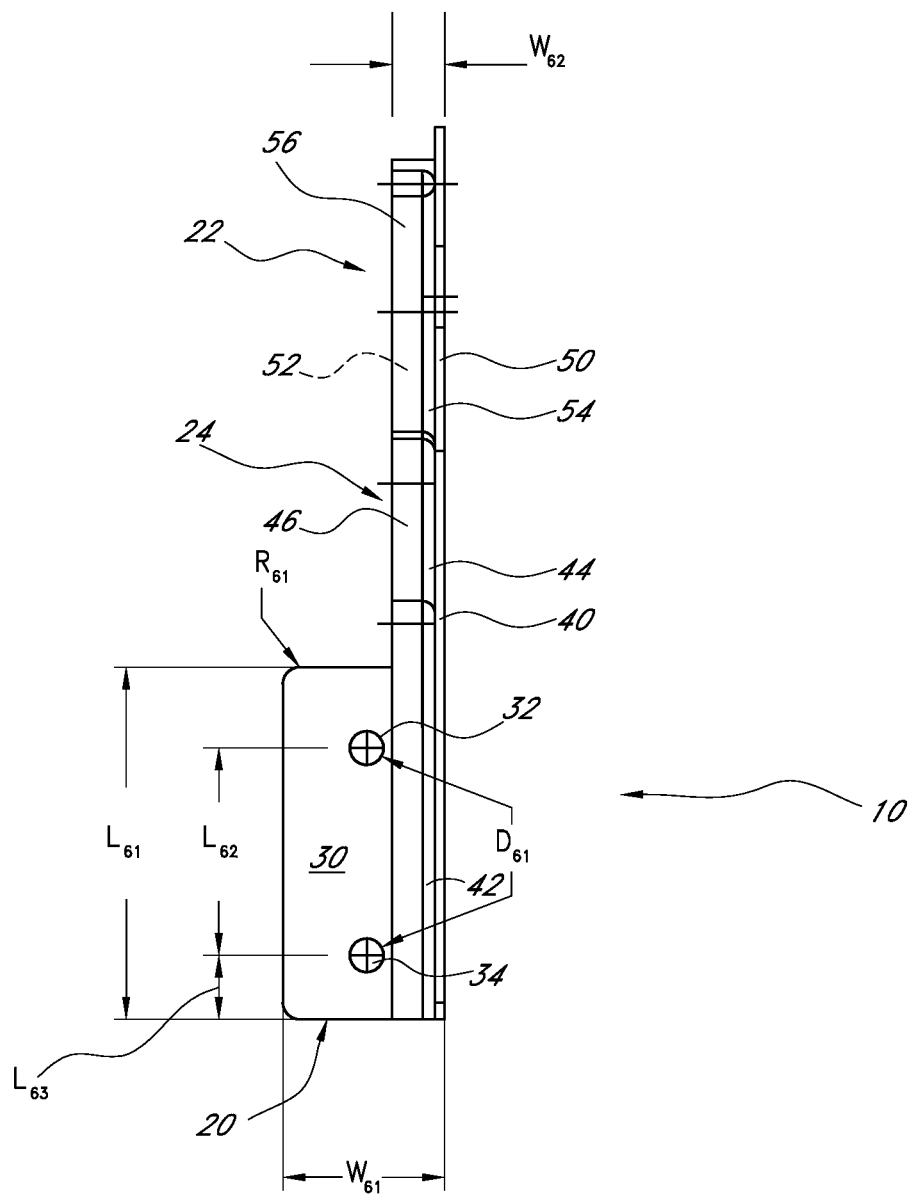
FIG. 6 is a simplified front view of the double offset pipe hanger and restrainer FIG. 4 illustrating features and advantages in accordance with certain embodiments of the invention.

Referring in particular to FIG. 6, in some embodiments, the distance or length $L_{61}$ is about 5.4 cm (2.125 inches), the distance or length $L_{62}$ is about 3.2 cm (1.250 inches), the distance or length $L_{63}$ is about 9.5 mm (0.375 inch(es)), the distance or length $W_{61}$ is about 2.4 cm (0.962 inch(es)), the distance or length $W_{62}$ is about 7.9 mm (0.312 inch(es)), the diameter $D_{61}$ is about 5.1 mm (0.201 inch(es)), and the radius of curvature $R_{61}$ is about 2.5 mm (0.100 inch(es)). In modified embodiments, the double offset pipe hanger and restrainer 10 can be dimensioned in other manners with efficacy, as needed or desired.

Figure 7:
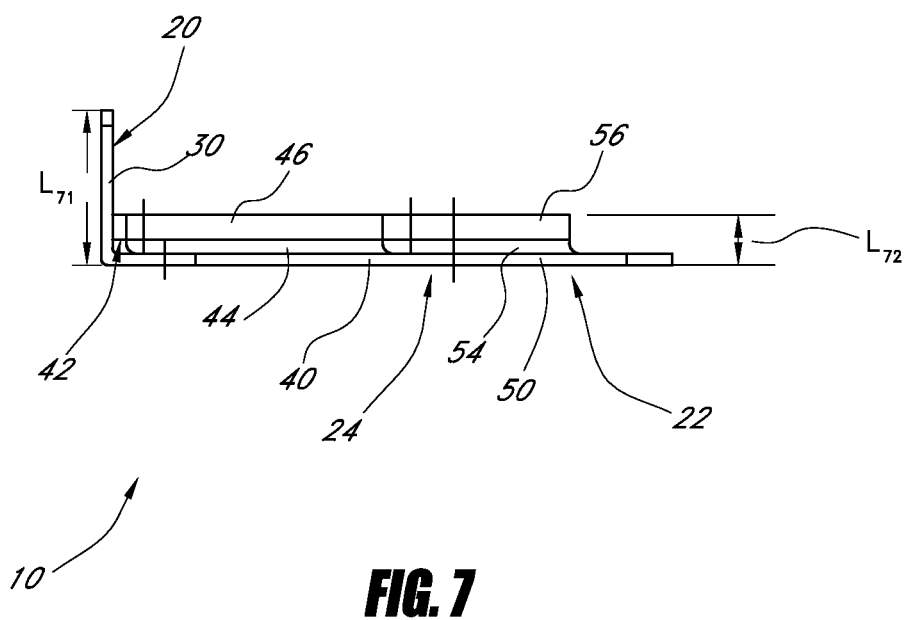
FIG. 7 is a simplified end view of the double offset pipe hanger and restrainer FIG. 4 illustrating features and advantages in accordance with certain embodiments of the invention.
Figure 8:
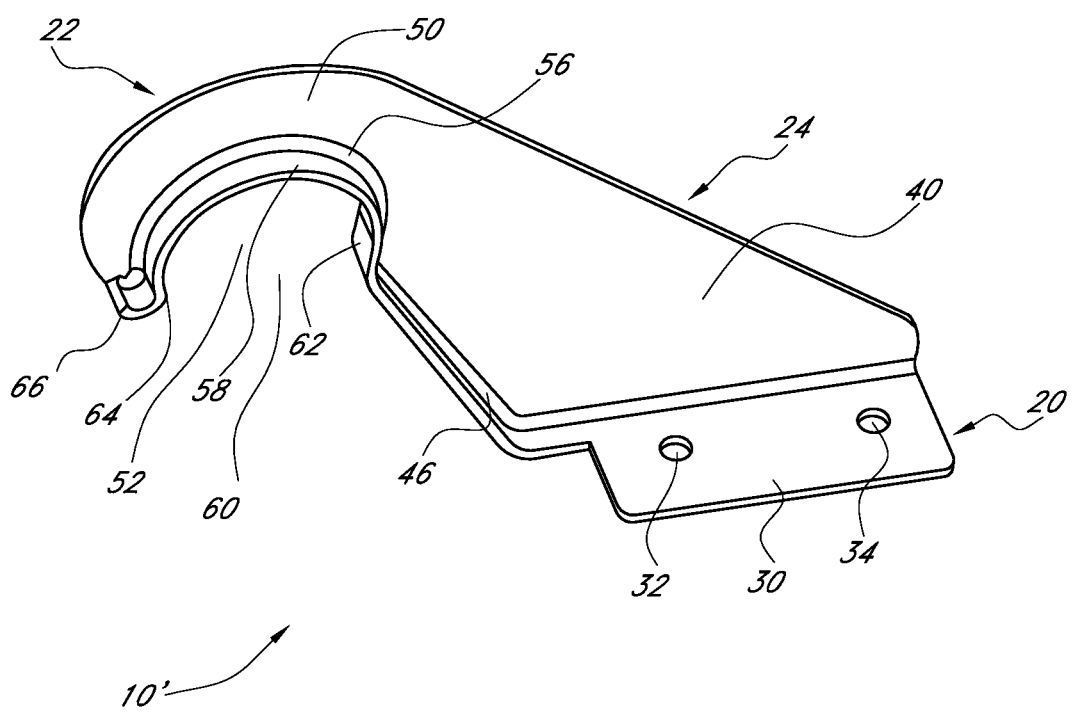
FIG. 8 is a simplified perspective of a double offset pipe hanger and restrainer having features and advantageous in accordance with certain other embodiments of the invention.

Referring in particular to FIG. 7, in some embodiments, the distance or length $L_{71}$ is about 2.4 cm (0.962 inch(es)), and the distance or length $L_{72}$ is about 7.9 mm (0.312 inch(es)). In modified embodiments, the double offset pipe hanger and restrainer 10 can be dimensioned in other manners with efficacy, as needed or desired.

Some Other Double Offset Pipe Support Embodiments

FIGS. 8-11 show different views of some embodiments of a double offset or standoff pipe hanger and restrainer, or double offset support device 10'. The double offset support device 10' is substantially the same as the double offset support device 10 (for example, see FIGS. 4-7) except that it is dimensioned to accommodate a pipe 12 of a different size. Like reference numerals in these figures refer to like elements disclosed, taught or suggested herein.

In some embodiments, the double offset pipe hanger and restrainer 10' is specially configured and dimensioned to support an industry standard ¾" CPVC pipe (nominal inner diameter of about ¾ inch(es)). As the skilled artisan will appreciate the double offset device of embodiments of the invention can be efficaciously utilized to support other loads, as needed or desired. The following dimensions are exemplary of a double offset device 10' particularly suited for supporting an industry standard ¾" CPVC pipe. As the skilled artisan will also appreciate, the offset or standoff provided by the following exemplary dimensions can be varied with efficacy, as needed or desired.

Figure 9:
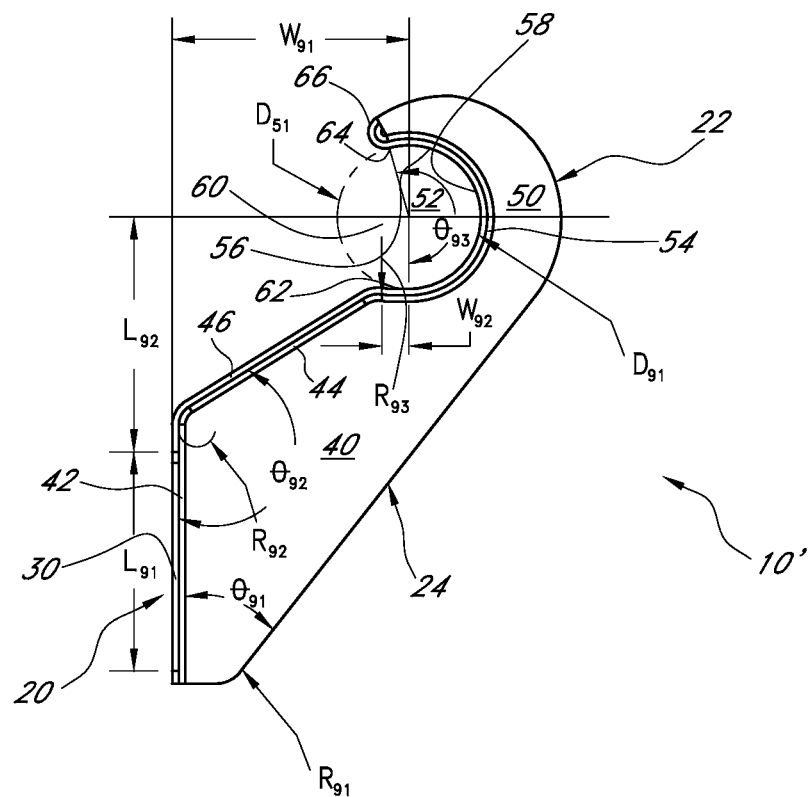
FIG. 9 is a simplified side view of the double offset pipe hanger and restrainer FIG. 8 illustrating features and advantages in accordance with certain embodiments of the invention.

Referring in particular to FIG. 9, in some embodiments, the distance or length $L_{91}$ is about 5.4 cm (2.125 inches), the distance or length $L_{92}$ is about 5.1 cm (2.025 inches), the distance or width $W_{91}$ is about 5.1 cm (2.025 inches), the diameter $D_{91}$ is about 2.7 cm (1.050 inches), the angle $\theta_{91}$ is about 37.37°, the angle $\theta_{92}$ is about 124.53°, the angle $\theta_{93}$ is about 204.00°, the radius of curvature $R_{91}$ is about 6.4 mm (0.250 inch(es)), the radius of curvature $R_{92}$ is about 4.8 mm (0.188 inch(es)), and the radius of curvature $R_{93}$ is about 4.8 mm (0.188 inch(es)). In modified embodiments, the double offset pipe hanger and restrainer 10' can be dimensioned in other manners with efficacy, as needed or desired.

Figure 10:
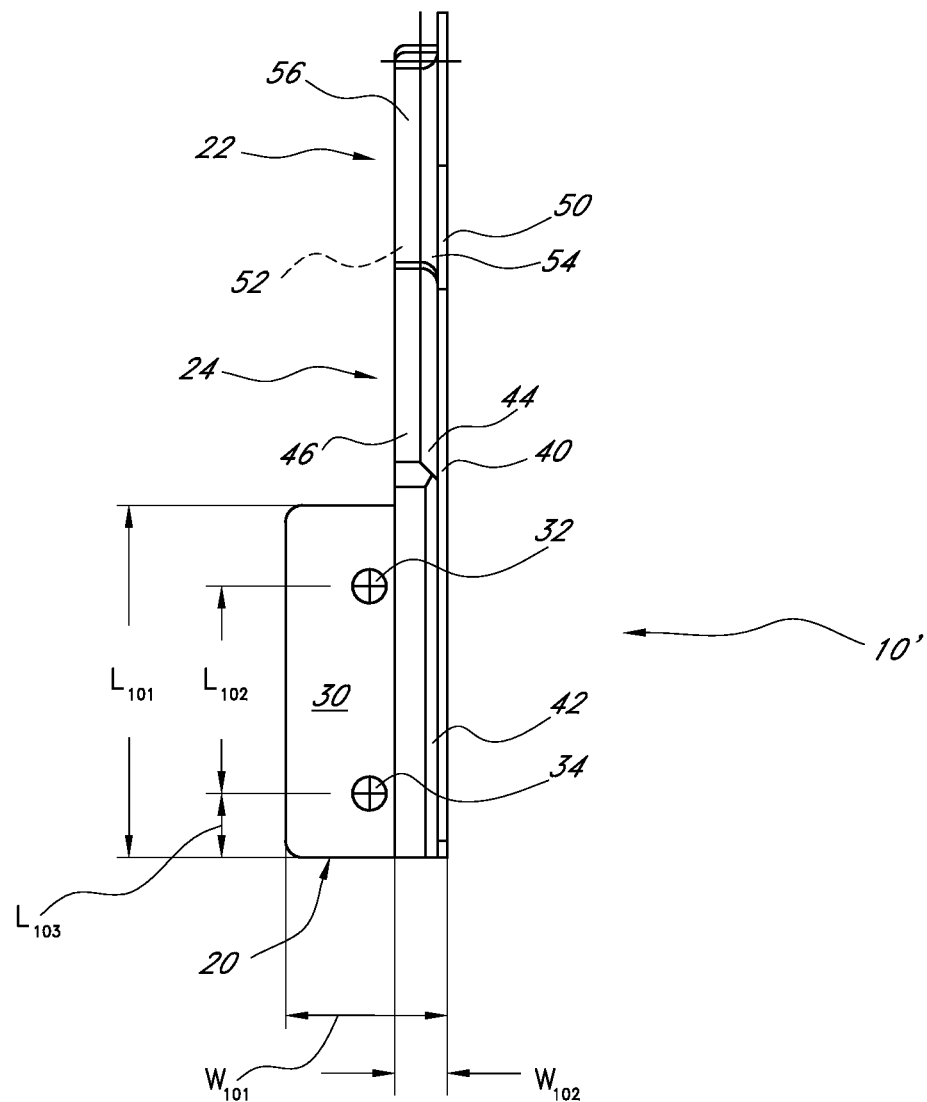
FIG. 10 is a simplified front view of the double offset pipe hanger and restrainer FIG. 8 illustrating features and advantages in accordance with certain embodiments of the invention.

Referring in particular to FIG. 10, in some embodiments, the distance or length $L_{101}$ is about 5.4 cm (2.125 inches), the distance or length $L_{102}$ is about 3.2 cm (1.250 inches), the distance or length $L_{103}$ is about 9.5 mm (0.375 inch(es)), the distance or length $W_{101}$ is about 2.4 cm (0.962 inch(es)), and the distance or length $W_{102}$ is about 7.9 mm (0.312 inch(es)). In modified embodiments, the double offset pipe hanger and restrainer 10' can be dimensioned in other manners with efficacy, as needed or desired.

Figure 11:
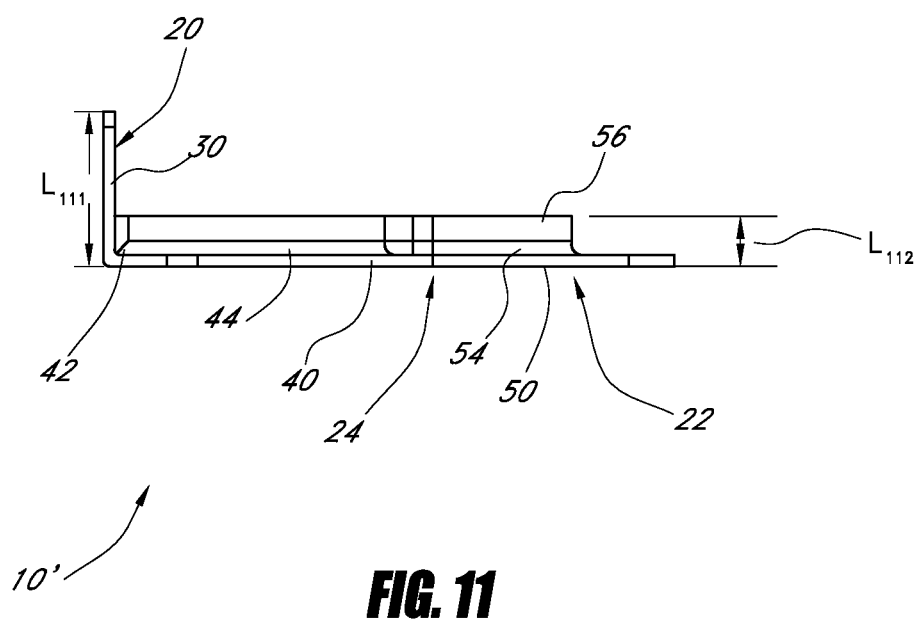
FIG. 11 is a simplified end view of the double offset pipe hanger and restrainer FIG. 8 illustrating features and advantages in accordance with certain embodiments of the invention.

Referring in particular to FIG. 11, in some embodiments, the distance or length $L_{111}$ is about 2.4 cm (0.962 inch(es)), and the distance or length $L_{112}$ is about 7.9 mm (0.312 inch(es)). In modified embodiments, the double offset pipe hanger and restrainer 10' can be dimensioned in other manners with efficacy, as needed or desired.

Double Offset Pipe Support Embodiments with Protective Tab

Figure 12:
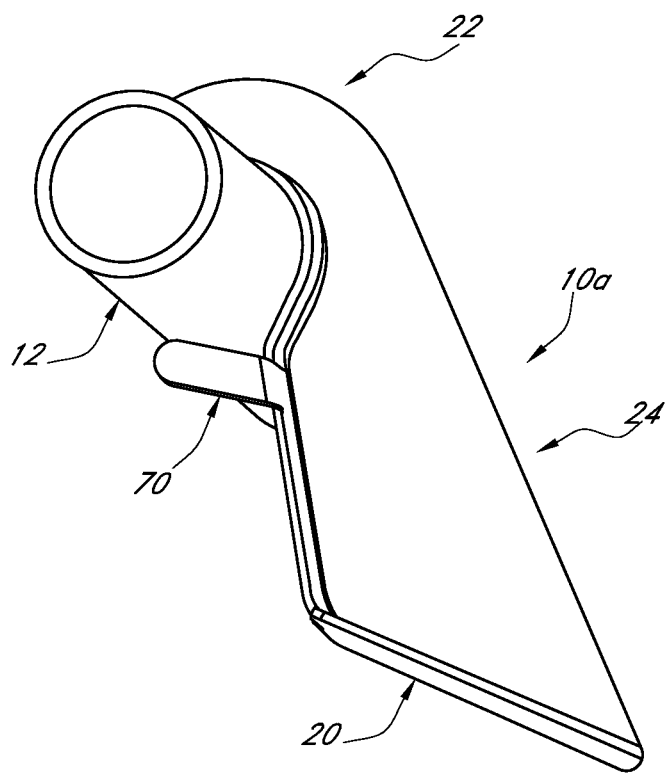
FIG. 12 is a simplified perspective view of a double offset hanger and restrainer with a locking tab supporting a pipe having features and advantageous in accordance with certain embodiments of the invention.

FIG. 12 shows some embodiments of a double offset pipe hanger and restrainer, or double offset or standoff pipe support device 10a comprising a locking tab 70 and supporting the pipe, conduit, tube or utility device 12. Advantageously, the tab, flap, stub or strip 70, in some embodiments, is relatively small in size and can be bent during installation to further facilitate in securing the pipe 12 to the double offset device 10a after installation. This desirably, in some cases, can provide additional support in a generally vertical or z-direction.

The protective tab 70 can be efficaciously used in conjunction with any of the double offset device embodiments disclosed, taught or suggested herein, as needed or desired. Like reference numerals in this figure refer to like elements disclosed, taught or suggested herein.

Double Offset Pipe Support Embodiments with Modified Mounting Portion

Figure 13:
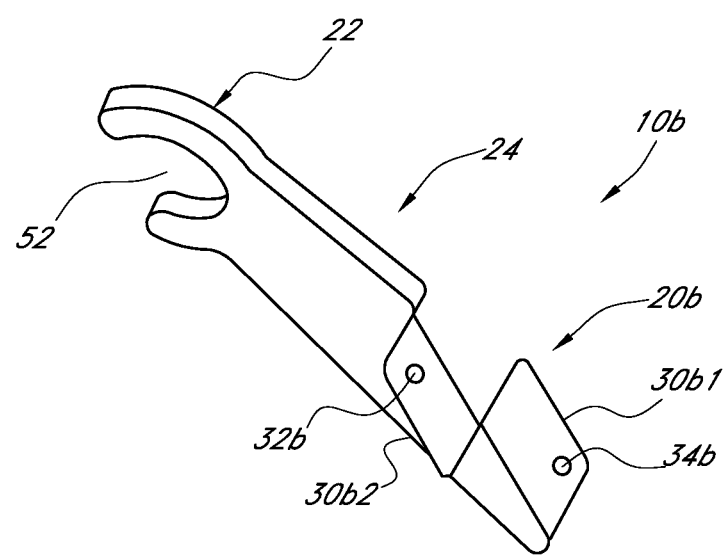
FIG. 13 is a simplified perspective of a double offset pipe hanger and restrainer having features and advantageous in accordance with certain further embodiments of the invention.
Figure 14:
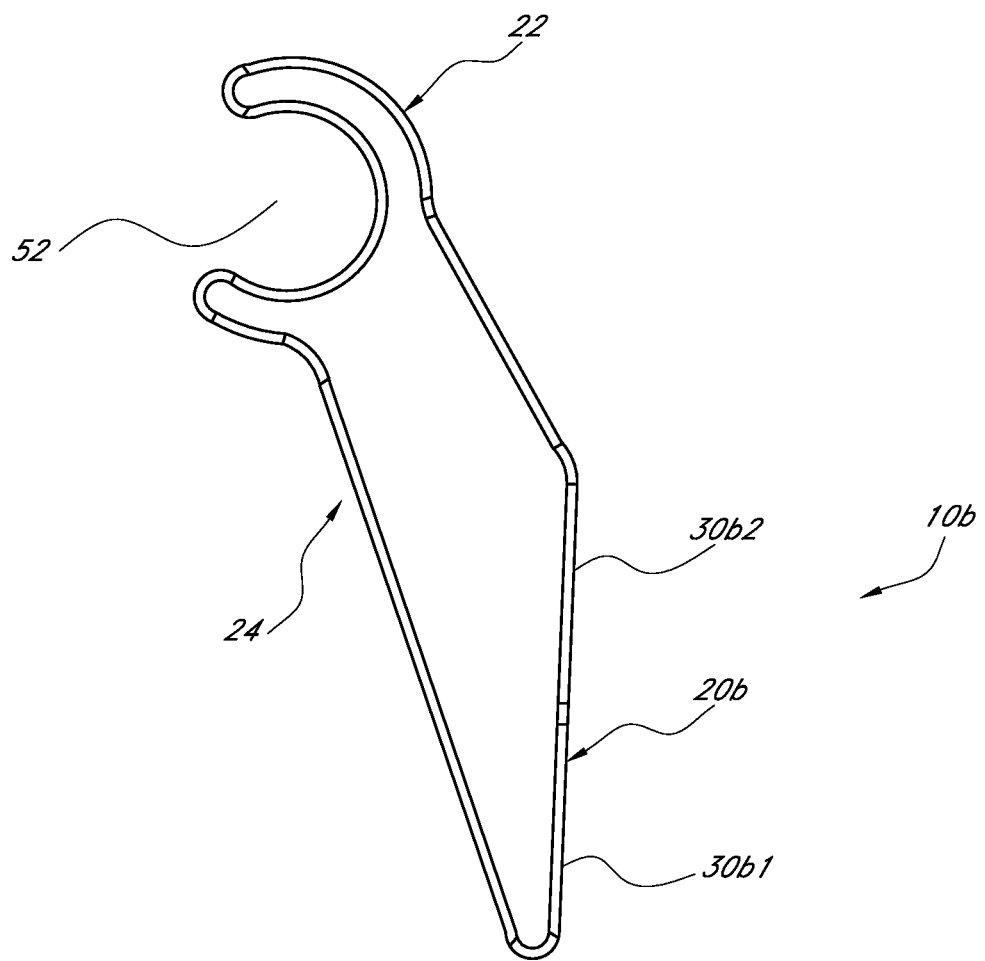
FIG. 14 is a simplified side view of the double offset pipe hanger and restrainer FIG. 13 illustrating features and advantages in accordance with certain embodiments of the invention.
Figure 15:
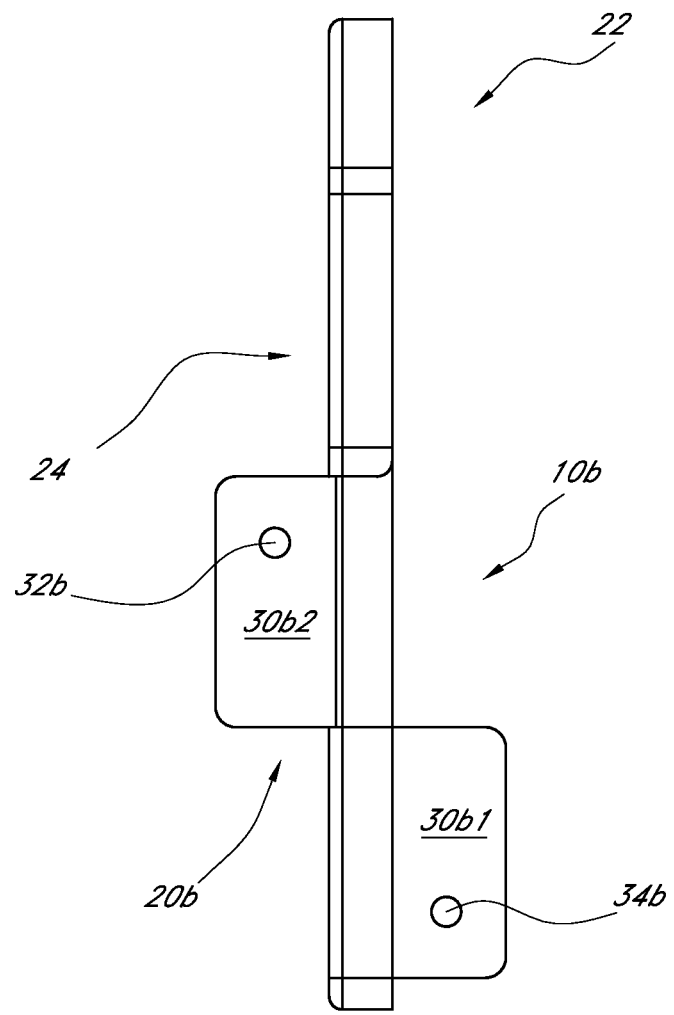
FIG. 15 is a simplified front view of the double offset pipe hanger and restrainer FIG. 13 illustrating features and advantages in accordance with certain embodiments of the invention.

FIGS. 13-15 show different views of some embodiments of a double offset or standoff pipe hanger and restrainer, or double offset support device 10b. The double offset support device 10b comprises a modified proximal mounting portion or section 20b, and can efficaciously incorporate any of the features of embodiments of double offset support devices disclosed, taught or suggested herein. Like reference numerals in these figures refer to like elements disclosed, taught or suggested herein.

The proximal mounting portion or section 20b, in some embodiments, comprises a pair of spaced generally rectangular flat plates or flanges 30b1, 30b2 that are optimally spaced by a predetermined distance to fit over the sides of the beam 14 or other support structure, so as to secure the double offset device 10b to the beam 14.

The proximal flanges 30b1, 30b2 comprise respective holes, openings or cavities 34b, 32b which are configured and/or adapted to receive respective fasteners, screws, bolts or connector pins that extend into respective beam holes or openings to secure the double offset device 10b to the beam 14 or other support structure. The holes 32b, 34b, in some embodiments, are desirably spaced such that the positions of the beam fasteners, screws, bolts or connector pins are optimized. This advantageously allows for the use of smaller size fasteners, for example, screws of smaller diameter and length, which in turn can save on the installation cost.

Method Embodiments of using the Double Offset Device Embodiments

The methods which are described and illustrated herein are not limited to the sequence of acts or steps described, nor are they necessarily limited to the practice of all of the acts or steps set forth. Other sequences of acts or steps, or less than all of the acts or steps, or simultaneous occurrence of the acts or steps, may be utilized in practicing embodiments of the invention.

Figure 16:
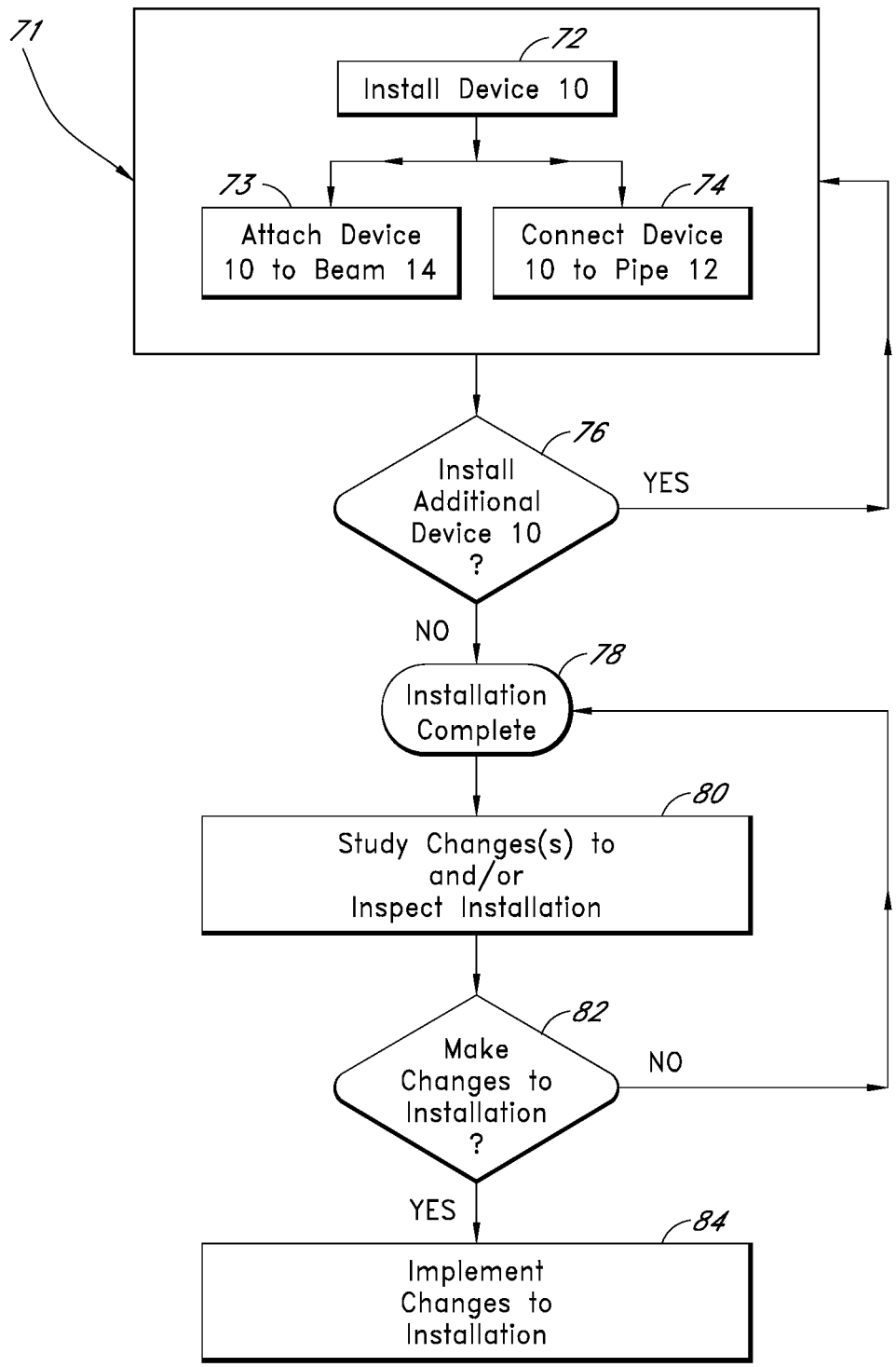
FIG. 16 is a simplified flow chart depicting some methods of using embodiments of the double offset device illustrating features and advantages in accordance with certain embodiments of the invention.
Figure 17:
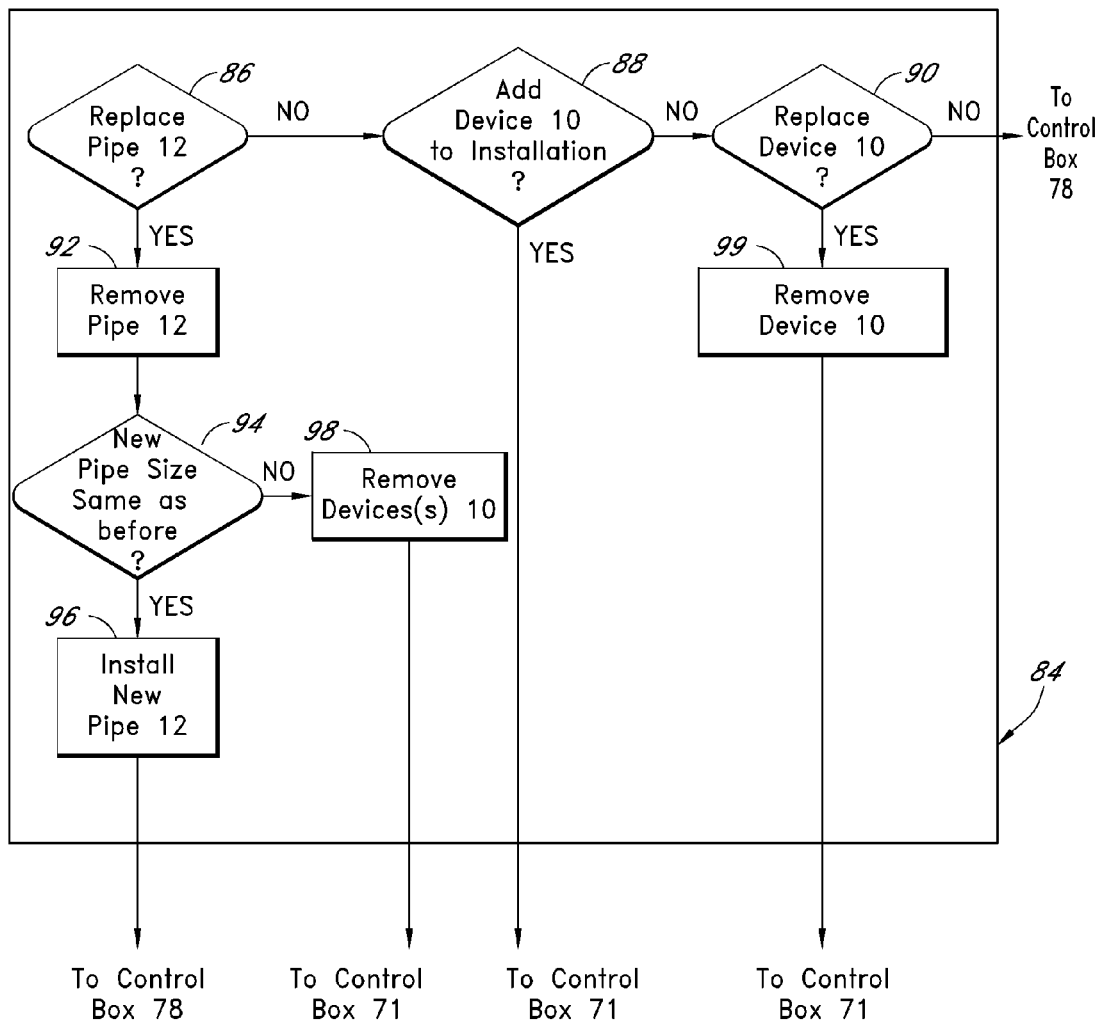
FIG. 17 is a simplified flow chart depicting further details of retrofit and/or replacement techniques relating to the flow chart of FIG. 16 illustrating features and advantages in accordance with certain embodiments of the invention.

FIGS. 16 and 17 are simplified flow charts in block diagram format or representation which represent embodiments of methods of using the double offset pipe hanger and restrainer (or double offset device) 10. It is to be understood that though FIGS. 16 and 17 refer to the double offset device 10, the methods described and illustrated in conjunction with these figures are substantially equivalently applicable to other embodiments of the double offset device taught or suggested herein, such as the double offset device 10', 10a, 10b.

The embodiments of FIG. 16 generally depict steps, acts or control blocks, boxes or elements referred to by reference numerals 71, 72, 73, 74, 76, 76, 78, 80, 82 and 84. The embodiments of FIG. 17 provide a more detailed illustration of retrofit and/or replacement techniques relating to the step(s), act(s) or control block, box or element 84 which generally comprise steps, acts or control blocks, boxes or elements referred to by reference numerals 86, 88, 90, 92, 94, 96, 98 and 99.

FIGS. 16 and 17 illustrate certain embodiments of methods of providing a new or initial installation of embodiments of the double offset device 10. Moreover, FIGS. 16 and 17 illustrate certain embodiments of methods of retrofit and/or replacement techniques for utilizing embodiments of the double offset device 10 which desirably highlight the versatility of the device 10 and its use.

Referring in particular to FIG. 16, in step or act 71, the device 10 is installed to support the pipe 12 and is mounted to the beam or support structure 14. Step or act 71 generally comprises a device installation step or act 72 which generally comprises a step or act 73 to attach the device 10 to the beam 14 and a step or act 74 to connect the device 10 to the pipe 12. The order in which steps 73 and 74 are performed can be varied with efficacy, as needed or desired, depending on the particular situation, for example, a new or initial installation, a retrofit installation or a replacement installation.

In step 74, embodiments of the double offset device 10 are conveniently snapped on or connected to the pipe 12 through the slot open end or portion 60 such that only a predetermined portion of the pipe outer contour, diameter, perimeter, surface or periphery is generally circumscribed by and in mechanical contact with (or abuts with) the slot closed end or portion 58 while the remaining corresponding portion of the pipe outer contour, diameter, perimeter, surface or periphery is exposed or uncovered. The double offset device 10 is advantageously configured such that the predetermined portion of the pipe outer contour, diameter, perimeter, surface or periphery that is generally circumscribed by and in mechanical contact with (or abuts with) the slot closed end or portion 58 provides the desired support against undesirable sway and/or seismic disturbances.

At step, act or control box 76 a decision is made whether to install an additional device 10. Typically, depending at least partially on the pipe size, more than one of the double offset devices 10 are used to support the pipe.

If it is decided to install an additional device 10, step 71 is repeated until the decision is made that no further devices 10 need to be installed. Control box or block 78 schematically illustrates that the installation is substantially complete now.

An additional step or act 80 can be provided, in some embodiments, to study if any change(s) are to be made to the installation and/or to inspect the installation. At this point, any fine-tuning changes may be made.

In step, act or control box 82 a decision is made whether or not to make changes to the installation. For a new or initial installation, except for some possible fine-tuning, typically no substantial changes will be made and the flow diagram returns to the installation complete control block or box 78.

However, after a period of time, steps, acts or control boxes 80 and/or 82 can be revisited, as needed or desired. This may be a period of few months or years, depending on the particular situation. If a decision is made to implement changes, then step or act 84 is performed to implement the needed or desired changes to the installation.

Referring now in particular to FIG. 17, the control module 84 is illustrated in greater detail in this drawing. The control module 84 generally comprises a step, act or control box 86 to decide whether or not to replace the pipe 12, a step, act or control box 88 to decide whether or not to add an additional device 10 to the installation, and a step, act or control box 90 to decide whether or not to replace an existing device 10.

Of course, if it is decided that no changes are to be made, the flow diagram returns to the installation complete control box 78. Then after a period of time, the steps, acts or control boxes 80 and/or 82 can be revisited, as needed or desired.

If a decision is made to replace the existing pipe 12 with another one, then at step or act 92 the pipe 12 is removed. Another pipe 12 may be installed, for example, a new one to replace an older damaged pipe or, in some cases, a new one with different material properties or different size or outer diameter to provide for the flow of a different fluid or a larger fluid flow rate.

Advantageously, because embodiments of the double offset device 10, provide a snap-on feature and/or a pipe-receiving slot open end 60 to receive the pipe 12 in the distal slot, opening or cavity 52, the pipe 12 can be easily and quickly removed from the device(s) 10 without the time-consuming need to disassemble and reassemble the entire installation.

In step, act or control box 94 it is determined whether or not the new pipe size (typically outer diameter) is the same a before. If it is, in act or step 96 the new pipe 12 is installed by simply fitting it into the double offset device(s) 10.

Advantageously again, because embodiments of the double offset device 10, provide a snap-on feature and/or a pipe-receiving slot open end 60 to receive the pipe 12 in the distal slot, opening or cavity 52, the new pipe 12 can be easily and quickly fitted into the device(s) 10 without the time-consuming need to disassemble and reassemble the entire installation.

If no other changes are to be made to the installation, the flow diagram then returns to the installation complete control box 78. Then after a period of time, the steps, acts or control boxes 80 and/or 82 can be revisited, as needed or desired.

If a decision is made to add an additional double offset device 10 to the installation, then flow diagram returns to the device installation step, act or control box 71. Then one or more additional devices 10 can be added to the installation, for example, to provide enhanced pipe support, as needed or desired.

Advantageously yet again, because embodiments of the double offset device 10, provide a snap-on feature and/or a pipe-receiving slot open end 60 to receive the pipe 12 in the distal slot, opening or cavity 52, the pipe 12 can be easily and quickly fitted into the device(s) 10 without the time-consuming need to disassemble and reassemble the entire installation.

If no other changes are to be made to the installation, the flow diagram then returns to the installation complete control box 78. Then after a period of time, the steps, acts or control boxes 80 and/or 82 can be revisited, as needed or desired.

If a decision is made to replace an existing device 10 of the installation, then at step or act 99, the device 10 is removed by detaching it from the beam 14 and disconnection it from the pipe 12. A device 10 may need to be replaced, for example, in the unlikely event that it suffers some kind of damage.

The flow diagram then returns to the device installation step, act or control box 71. One or more devices 10 can be added to replace existing devices 10 of the installation, as needed or desired.

Advantageously still again, because embodiments of the double offset device 10, provide a snap-on feature and/or a pipe-receiving slot open end 60 to receive the pipe 12 in the distal slot, opening or cavity 52, the device(s) 10 can be easily and quickly removed from the pipe 12 and replaced with new device(s) 10 without the time-consuming need to disassemble and reassemble the entire installation.

If no other changes are to be made to the installation, the flow diagram then returns to the installation complete control box 78. Then after a period of time, the steps, acts or control boxes 80 and/or 82 can be revisited, as needed or desired.

Some Advantages of Embodiments of the Double Offset Device

Embodiments of the double offset pipe hanger and restrainer or double offset device 10 (and its modified embodiments such as the double offset devices 10', 10a, 10b) provide a plurality of unique advantages and benefits. The double offset device 10 (and its modified embodiments such as the double offset devices 10', 10a, 10b) are specially configured and designed to optimally restrain movement of the pipe 12 during seismic and/or sway events, while providing adequate support of the load.

Advantageously, embodiments of the pipe-receiving opening or slot 52 connects to the pipe 12 in a snap-on fashion and provides the needed support in the generally vertical direction (or z-direction) wherein the forces of interest are concentrated. One advantage of this is that the specially configured slot 52 saves on wastage of material while providing the desired support in the direction(s) where most seismic and sway forces are exerted. Another advantage is that, this allows retrofit and/or replacement installation of the double offset device 10 (and its modified embodiments such as the double offset device 10', 10a, 10b) without the cumbersome tasks associated with disassembling and reassembling the entire installation. This versatility of embodiments of the invention saves precious time and cost.

Embodiments of the double offset device 10 (and its modified embodiments such as the double offset devices 10', 10a, 10b) can be conveniently snapped on or connected to the pipe 12 through the slot open end or portion 60 such that only a predetermined portion of the pipe outer contour, diameter, perimeter, surface or periphery is generally circumscribed by and in mechanical contact with (or abuts with) the slot closed end or portion 58 while the remaining portion of the pipe outer contour, diameter, perimeter, surface or periphery is exposed or uncovered. The double offset device is advantageously configured such that the predetermined portion of the pipe outer contour, diameter, perimeter, surface or periphery that is generally circumscribed by and in mechanical contact with (or abuts with) the slot closed end or portion 58 provides the desired support against undesirable sway and/or seismic disturbances.

In some embodiments, the double offset device 10 (and its modified embodiments) are configured to provide a generally flat portion 62 for advantageously supporting the pipe 12. In some embodiments, such as that of FIG. 12, the double offset device 10a comprises the protective tab 70 to further support the pipe 12 and provide enhanced benefits.

In some embodiments, the arrangements and/or spacing of the fastener receiving holes 32, 34 (and/or 32b, 34b) is advantageously optimized such that it permits the use of smaller fastening devices. This desirably saves on cost. Moreover, these savings are multiplied since many double offset devices are typically utilized in a pipe-supporting installation.

In some embodiments, the double offset device 10 (and its modified embodiments such as the double offset devices 10', 10a, 10b) are desirably configured to prevent or mitigate undesirable stress concentration(s) which could lead to fracture or breakage location(s) or points, thereby advantageously preventing device failure or fracture. Advantageously, this can be accomplished by not incorporating any strength compromising bends or cut-outs while maintaining suitable or optimal structural strength.

As indicated above, the methods which are described, illustrated, disclosed, taught and/or suggested herein are not limited to the sequence of acts or steps described, nor are they necessarily limited to the practice of all of the acts or steps set forth. Other sequences of acts or steps, or less than all of the acts or steps, or simultaneous occurrence of the acts or steps, may be utilized in practicing embodiments of the invention.

It is to be understood that any range of values disclosed, taught or suggested herein comprises all values and sub-ranges therebetween. For example, a range from 5 to 10 will comprise all numerical values between 5 and 10 and all sub-ranges between 5 and 10.

From the foregoing description, it will be appreciated that a novel approach for supporting loads has been disclosed. While the components, techniques and aspects of the invention have been described with a certain degree of particularity, it is manifest that many changes may be made in the specific designs, constructions and methodology herein above described without departing from the spirit and scope of this disclosure.

While a number of preferred embodiments of the invention and variations thereof have been described in detail, other modifications and methods of using and construction and utilities applications for the same will be apparent to those of skill in the art. Accordingly, it should be understood that various applications, modifications, and substitutions may be made of equivalents without departing from the spirit of the invention or the scope of the claims.

Various modifications and applications of the invention may occur to those who are skilled in the art, without departing from the true spirit or scope of the invention. It should be understood that the invention is not limited to the embodiments set forth herein for purposes of exemplification, but is to be defined only by a fair reading of the claims, including the full range of equivalency to which each element thereof is entitled.

What is claimed is:

1. A pipe hanger having first and second sides, the pipe hanger comprising:
    a planar plate having opposite first and second planar faces with generally trapezoidal shapes at the respective first and second sides of the pipe hanger, opposite proximal and distal ends, and opposite first and second side edges between the first and second planar faces and extending from the proximal end to the distal end;
    a plate rib at the first side edge of the planar plate and extending transversely outward from only the first planar face of the planar plate;
    a mounting flange extending transversely outward from only the first planar face of the planar plate at the proximal end of the planar plate; and
    a planar hook at the distal end of the flat plate, the planar hook having opposite first and second planar faces that are generally co-planar with the respective first and second planar faces of the planar plate, and a curved side edge portion between the first and second planar faces of the planar hook that is contiguous with the first side edge of the planar plate, wherein the curved side edge portion defines a slot sized and shaped to receive a circumferential portion of a pipe therein,
    wherein the first side of the pipe hanger is generally non-planar and defined, at least in part, by the first planar face of the planar plate, the plate rib, the mounting flange, and the first planar face of the planar hook,
    wherein the second side of the pipe hanger is generally planar and defined, at least in part, by the second planar face of the planar plate and the second planar face of the planar hook.

2. The pipe hanger set forth in claim 1, wherein the plate rib has a length extending along an entire length of the first side edge.

3. The pipe hanger set forth in claim 1, further comprising a hook rib at the curved side edge portion of the planar hook and extending transversely outward from only the first planar face of the hook.

4. The pipe hanger set forth in claim 3, wherein the hook rib has a length extending along an entire length of the curved side edge portion of the planar hook.

5. The pipe hanger set forth in claim 4,
    wherein the hook rib is contiguous with the plate rib.

6. The pipe hanger set forth in claim 1, wherein the mounting flange defines fastener openings for receiving fasteners to fasten the mounting flange to a support structure.

7. The pipe hanger set forth in claim 1, wherein the planar hook is configured to receive the pipe in the slot in a snap-on manner.

8. The pipe hanger set forth in claim 1, wherein the planar plate, the mounting flange, and the planar hook are integrally formed from a single sheet of material.

9. The pipe hanger set forth in claim 1, wherein the planar plate has a span extending between the first and second side edges of the planar plate, wherein the span tapers toward the distal end of the planar plate.

* * * * *